United States Patent
Tano et al.

(10) Patent No.: US 7,993,619 B2
(45) Date of Patent: Aug. 9, 2011

(54) RAW OIL COMPOSITION FOR CARBON MATERIAL FOR ELECTRIC DOUBLE LAYER CAPACITOR ELECTRODE

(75) Inventors: Tamotsu Tano, Kuga-gun (JP); Takashi Oyama, Kuga-gun (JP); Ippei Fujinaga, Kuga-gun (JP); Hideki Ono, Kawasaki (JP); Masaki Fujii, Kawasaki (JP)

(73) Assignee: Nippon Oil Corporation, Tokyo (JP)

( * ) Notice: Subject to any disclaimer, the term of this patent is extended or adjusted under 35 U.S.C. 154(b) by 664 days.

(21) Appl. No.: 11/993,286

(22) PCT Filed: Jun. 15, 2006

(86) PCT No.: PCT/JP2006/312033
§ 371 (c)(1),
(2), (4) Date: Dec. 20, 2007

(87) PCT Pub. No.: WO2006/137323
PCT Pub. Date: Dec. 28, 2006

(65) Prior Publication Data
US 2008/0304206 A1 Dec. 11, 2008

(30) Foreign Application Priority Data
Jun. 21, 2005 (JP) .............................. 2005-180637

(51) Int. Cl.
*C01B 31/00* (2006.01)
*C01B 3/04* (2006.01)
*H01G 9/00* (2006.01)
*C08L 95/00* (2006.01)

(52) U.S. Cl. ................... 423/445 R; 423/448; 361/502; 524/64

(58) Field of Classification Search .................. None
See application file for complete search history.

(56) References Cited

U.S. PATENT DOCUMENTS

| 4,865,741 A | * | 9/1989 | Nolte et al. ............... 210/635 |
| 2007/0056881 A1 | * | 3/2007 | Berkowitz et al. ............ 208/435 |

FOREIGN PATENT DOCUMENTS

| CA | 2242774 A1 | * | 2/2000 |
| JP | 2-138388 | | 5/1990 |
| JP | 2001-52972 A | | 2/2001 |
| JP | 2002-25867 A | | 1/2002 |
| JP | 2002-93667 A | | 3/2002 |
| JP | 2003-51430 A | | 2/2003 |
| JP | 2004-182504 A | | 7/2004 |
| JP | 2004-247433 A | | 9/2004 |
| JP | 2005001969 A | * | 1/2005 |
| JP | 2005-235873 A | | 9/2005 |

* cited by examiner

*Primary Examiner* — Melvin C Mayes
*Assistant Examiner* — Guinever S Gregorio
(74) *Attorney, Agent, or Firm* — Knobbe, Martens, Olson & Bear, LLP

(57) ABSTRACT

The present invention provides a raw oil composition for manufacturing a carbon material for electric double layer capacitor electrodes, characterized in that the raw oil composition comprises 25 wt % or more of a saturated component and 16 wt % or less of an asphaltene component among the saturated component, an aromatic component, a resin component, and the asphaltene component obtained by developing of the raw oil composition by thin-layer chromatography; the raw oil composition has an average molecular weight of 960 or less; and the raw oil composition has an aromatic-carbon-fraction (fa) of 0.22 to 0.72. Use of the raw oil composition provides a carbon material for electric double layer capacitor electrodes that can exhibit high capacitance with high reproducibility without manufacturing synthetic pitch.

14 Claims, No Drawings

RAW OIL COMPOSITION FOR CARBON MATERIAL FOR ELECTRIC DOUBLE LAYER CAPACITOR ELECTRODE

This application is the U.S. National Phase under 35 U.S.C. §371 of International Application PCT/JP2006/312033, filed Jun. 15, 2006, which claims priority to Japanese Patent Application No. 2005-180637, filed Jun. 21, 2005. The International Application was published under PCT Article 21(2) in a language other than English.

TECHNICAL FIELD

The present invention relates to a raw oil composition for manufacturing a carbon material for the electrodes of an electric double layer capacitor (hereinafter, referred to as EDLC). In particular, the present invention relates to a raw oil composition for manufacturing a carbon material that can exhibit high capacitance with high reproducibility.

BACKGROUND ART

Carbon materials for EDLC electrodes have conventionally been manufactured by subjecting a raw material carbon (pitch) to alkaline activation, either directly or after carbonization (dry distillation).

The method of direct activation of a raw material pitch has a problem of providing EDLCs having a capacitance as low as 20 F/cc or so. In contrast, it is known that the method of activation after dry distillation provides high capacitance.

For example, JP-A-2002-25867 (claim 8) discloses a process for manufacturing nonporous carbon that contains graphite-like microcrystalline carbon, and has a specific surface of 270 m$^2$/g or less, and a distance $d_{002}$ between microcrystalline carbon layers of 0.360 to 0.380 by dry distilling easily graphitizable carbon that is rich in layered graphitic microcrystals at 700° C. to 850° C. to obtain calcined carbon, treating the resulting calcined carbon with caustic alkali at 800° C. to 900° C., and subsequently removing the remaining alkali. EDLCs from carbon electrodes obtained by this process exhibit high capacitances of 29 F/cc or more. Specifically, a carbon material is used which is produced by heating (calcination) a material such as petroleum needle coke or hardened pitch at 650° C. to 850° C. under nitrogen flow for 2 to 4 hours, followed by activation.

In order to manufacture activated carbon for EDLC electrodes by hardening mesophase pitch followed by carbonization and alkaline activation, JP-A-2001-52972 proposed a process of milling bulk mesophase pitch, hardening the pitch followed by carbonization and alkaline activation. JP-A-. 2002-93667 also proposed a process of subjecting a raw material pitch that has a softening point of 150° C. to 350° C., an H/C of 0.5 to 0.9, and an optical anisotropy content of 50% or more to milling into particles having an average particle diameter of 5 to 90 µm, and subsequently to activation at 400° C. to 900° C. These processes provide carbon materials for electric double layer capacitor electrodes having high capacitances of 30 F/cc or more. The methods, however, have a drawback of providing low reproducibility of such capacitances, and thus use of the methods cannot provide high capacitances with stability. In order to overcome the drawback, JP-A-2004-182504 proposed a process of subjecting a pitch having a crystallite thickness Lc(002) of 5.0 nm or more in the c axis direction determined by X-ray diffraction to carbonization and then activation. It is proposed that a raw material pitch having such a property is preferably a synthetic pitch, and can be obtained by polymerizing a condensed polycyclic hydrocarbon having at least one alkyl substituent as a raw material in the presence of hydrogen fluoride and boron trifluoride at 100° C. to 400° C.; and 5 wt % or more of the synthetic pitch is added to an inexpensive pitch without an alkyl substituent such as naphthalene pitch or anthracene pitch.

JP-A-2003-51430 discloses a method of subjecting a raw material carbon containing microcrystalline carbon having a graphite-like crystalline layered structure to heating at 600° C. to 900° C. and subsequently to activation. Use of the method provides EDLCs having capacitances of 30 F/cc or more by using as the raw material carbon a raw carbon composition having an interlayer distance $d_{002}$ of 0.343 nm or less as determined by X-ray diffraction, and having the crystallite size of microcrystalline carbon of 3.0 nm as determined by X-ray diffraction.

DISCLOSURE OF INVENTION

Problem to be Solved by the Invention

Use of conventional methods enables high capacitance, however, it has a problem that desired properties, in particular, high capacitance cannot be achieved with high reproducibility because of variations among lots of raw material pitch. The above 4th document enables the reproducibility, but it requires manufacturing of a synthetic pitch, which is disadvantageous in terms of cost.

In the paragraph [0054] of the above 5th document, there is described, "a raw material carbon can be obtained by coking heavy hydrocarbon, that does not contain impurities such as sulfur or metals and has appropriate aromaticity, under proper conditions." There is also described, "Examples of 'the heavy hydrocarbon having appropriate aromaticity' may include the bottom oil of a petroleum heavy oil in a fluid catalytic cracker, a residue oil in a vacuum distillation apparatus, and the tar of aromatic compounds. For example, petroleum coke as a raw material carbon can be obtained by heating such a heavy hydrocarbon under pressure in a delayed coker." The fact is, however, that any specific composition of the heavy hydrocarbon is not considered.

An object of the present invention is to find a raw oil composition having a composition that can provide a carbon material for the electrodes of an electric double layer capacitor that can exhibit high capacitance with high reproducibility without manufacturing synthetic pitch.

Means for Solving the Problem

Typically, a raw oil composition for manufacturing a raw material carbon mainly comprises four components of a saturated component, an aromatic component, a resin component, and an asphaltene component. The present inventors have found the optimum composition ranges of the components of a raw oil composition for providing a carbon material for electric double layer capacitor electrodes. Thus the inventors have accomplished the present invention.

That is, the present invention relates to a raw oil composition for manufacturing a carbon material for electric double layer capacitor electrodes, characterized in that the raw oil composition comprises 25 wt % or more of a saturated component and 16 wt % or less of an asphaltene component among the saturated component, an aromatic component, a resin component, and the asphaltene component obtained by developing of the raw oil composition by thin-layer chromatography; the raw oil composition has an average molecular weight of 960 or less; and the raw oil composition has an aromatic-carbon-fraction (fa) of 0.22 to 0.72.

The present invention also relates to a raw carbon composition obtained from the raw oil composition, a carbon material for electric double layer capacitor electrodes obtained by activating the raw carbon composition, and an electric double layer capacitor comprising the carbon material.

Effects of the Invention

According to the present invention, a carbon material for EDLC electrodes that exhibit high capacitance with high reproducibility can be obtained with stability by properly adjusting the composition of starting raw oil without manufacturing synthetic pitch. Thus EDLCs having high capacitances of 30 F/cc or more can be provided.

In particular, according to the present invention, the composition of raw material oil at the start of its processing can be optimized for a carbon material for EDLC electrodes, and thus the composition can be easily adjusted.

BEST MODE FOR CARRYING OUT THE INVENTION

Hereinafter, the present invention is described further in detail.

A raw oil composition according to the present invention is characterized in that the raw oil composition comprises 25 wt % or more of a saturated component and 16 wt % or less of an asphaltene component in total 100 wt % of the saturated component, an aromatic component, a resin component and the asphaltene component as developed by thin-layer chromatography; the raw oil composition has an average molecular weight of 960 or less; and the raw oil composition has an aromatic-carbon-fraction (fa) of 0.22 to 0.72.

The content of saturated component preferably is 30 wt % or more, more preferably 35 wt % or more. The asphaltene component preferably has less content, preferably 12 wt % or less, and more preferably 8 wt % or less. The fa is preferably 0.25 or more, and more preferably 0.30 or more. The average molecular weight is preferably 700 or less, and more preferably 600 or less. When the content of saturated component is less than 25 wt %, the amount of the aromatic component tends to increase accordingly. Excessive amount of the aromatic component can cause the aromatic-carbon-fraction (fa) to exceed the above-described upper limit. As the content of the resin component increases, the molecular weight increases. This can result in the average molecular weight in excess of the predetermined value.

In order to meet the conditions, the content of aromatic component is preferably 35 wt % or more, more preferably 40 wt % or more. The content of aromatic component is preferably 70 wt % or less, more preferably 65 wt % or less.

Examples of the raw oil may include the bottom oil of a petroleum heavy oil in a fluid catalytic cracker, a residue oil in a vacuum distillation apparatus (VR), and the tar of aromatic compounds. In the present invention, these oils are combined as necessary to prepare a raw oil composition having the composition predetermined in the present invention. For example, oils are combined as necessary, and part of the combined oil is sampled; then a raw material oil satisfying the predetermined conditions in the present invention is transferred to the subsequent carbonization process while a raw material oil not satisfying the predetermined conditions is adjusted again, whereby only oils satisfying the predetermined conditions in the present invention are transferred to the subsequent carbonization process.

Note that it is obviously preferred that the raw oil composition does not contain impurities such as sulfur or metals, if possible.

Next, there are described methods for determining the composition ratio of each component, average molecular weight, and the fa value in the present invention.

[Analysis of Composition Ratio]

In the present invention, the composition ratio of each component in raw material oil is determined by TLC-FID method. TLC-FID method is conducted as follows: a sample is separated into four components of a saturated component, an aromatic component, a resin component, and an asphaltene component by thin-layer chromatography (TLC); subsequently each component is detected by a Flame Ionization Detector:FID; and the composition ratio of each component is defined as the content of each component to the total contents of the components on a percentage basis. In the determination, an IATROSCAN MK-5 (tradename) manufactured by Dia-Iatron Co., Ltd. (current Mitsubishi Kagaku Iatron, Inc.) was used.

First, 0.2 g±0.01 g of sample is dissolved in 10 ml of toluene to prepare a sample solution. The lower end (the position of 0.5 cm from the rod holder) of a silica gel thin layer rod (chromarod) baked beforehand is spotted with 1 µl of the solution by using a micro syringe, and the solution is dried by using a dryer or the like. Then 10 chromarods are handled as a set, and the sample is developed by using developers. As for the developers, hexane was used for the first development vessel, hexane/toluene (20:80) for the second development vessel, and dichloromethane/methanol (95/5) for the third development vessel. The developed chromarods are loaded in the IATROSCAN to measure the amount of each component.

[Average Molecular Weight]

The average molecular weight of the raw material oil is determined by vapor pressure equilibrium method. The overview of the method is as follows: two thermistors are placed in saturated vapor of a solvent maintained at a predetermined temperature, and a sample solution is dropped on one of the thermistors and the solvent alone is dropped on the other thermistor. At this time, the sample solution has lower vapor pressure than the solvent alone, and the vapor of atmosphere around the thermistor is condensed on the sample solution. The latent heat released at this time increases temperature, and this temperature difference is determined as the voltage difference ($\Delta V$) of the thermistor. Then the molar concentration of the sample in the sample solution is determined based on a calibration curve of the relationship between molar concentration and voltage difference ($\Delta V$) obtained beforehand by using a reference sample having a known molecular weight. Thus the average molecular weight is calculated. In the present invention, cyclohexane was used as the solvent and n-cetane (molecular weight: 226.4) was used as the reference sample.

[Aromatic-Carbon-Fraction (fa)]

Aromatic-carbon-fraction (fa) is determined by Knight method. In the Knight method, the distribution of carbon as the spectrum of aromatic carbon obtained by the $^{13}$C-NMR method is divided into three components ($A_1$, $A_2$, $A_3$). $A_1$ corresponds to the number of carbon in an aromatic ring, substituted aromatic carbons, and half of unsubstituted aromatic carbons (corresponding to the peak of about 40 to 60 ppm by $^{13}$C-NMR). $A_2$ corresponds to the other half of the unsubstituted aromatic carbons (corresponding to the peak of about 60 to 80 ppm by $^{13}$C-NMR). $A_3$ corresponds to the number of aliphatic carbons (corresponding to the peak of about 130 to 190 ppm by $^{13}$C-NMR). Based on $A_1$, $A_2$ and $A_3$, fa is determined by the following expression:

$$fa=(A_1+A_2)/(A_1+A_2+A_3)$$

The $^{13}$C-NMR method is the best method for quantitatively determining fa, which is the most basic parameter among the chemical structure parameters of pitches. This is written in a document: "*Characterization of Pitch II. Chemical Structure*" Yokono and Sanada, Tanso No. 105, p 73-81 (1981).

The raw oil composition thus adjusted to have a specific composition is then used to prepare a raw material carbon and activate it by the methods known in the art, whereby a carbon material for EDLC electrodes is prepared.

<Carbonization>

The raw oil composition having the predetermined composition is carbonized by a method known in the art. For example, a raw carbon composition can be obtained by coking the raw oil composition in an autoclave under a certain pressure such as 1 MPa at a temperature from about 400° C. to 600° C. for several hours. The raw oil composition according to the present invention is easily graphitizable, and condensed polycyclic aromatics generated by thermal decomposition reaction are stacked in the coking process to provide a raw material carbon containing graphite-like microcrystalline carbon. In particular, the graphite-like microcrystalline carbon is preferably contained in the raw carbon composition according to the present invention.

<Activation>

The raw carbon composition is activated to provide carbon materials for EDLC electrodes. The activation can be conducted by known methods such as activation reaction by using an agent or a gas. It is more preferred to effect activation reaction by using an agent, in particular, activation reaction by using an alkali metal compound. Such an activation by using an alkali metal compound allows the alkali metal to intrude between graphite crystalline layers and react with them, thereby increasing the specific surface of a carbon material to be obtained.

As for the alkali metal compound, various carbonates or hydroxides may be used. Specific examples of the compound may include sodium carbonate, potassium carbonate, potassium hydroxide, sodium hydroxide, lithium hydroxide, rubidium hydroxide, and cesium hydroxide. Among these examples, preferred are alkali metal hydroxides such as potassium hydroxide and sodium hydroxide, and particularly preferred is potassium hydroxide. It is also possible to combine two or more of the alkali metal compounds such as combined use of potassium hydroxide and sodium hydroxide.

Activation is generally conducted by mixing an activator such as an alkali metal compound and a raw carbon composition, and heating the mixture. The mixing ratio of the raw carbon composition and the activator such as an alkali metal hydroxide is not particularly restricted, but generally the weight ratio between the composition and the activator (the raw carbon composition: the activator) is preferably in the range of 1:0.5 to 1:10, and more preferably in the range of 1:1 to 1:5. In general, when the amount of the activator such as an alkali metal compound is too small, activation reaction does not proceed sufficiently and the required surface area possibly cannot be obtained. On the other hand, although use of more activator provides larger specific surface, activation cost increases and activation yield decreases, and furthermore the bulk density of a carbon material to be obtained tends to decrease, thereby decreasing capacitance per unit volume.

The heating temperature for the activation is not particularly restricted, but the lower limit is generally 500° C., preferably 600° C. while the upper limit is generally 1000° C., preferably 900° C., and particularly preferably 800° C.

In the present invention, the raw carbon composition is activated in this way, generally followed by steps of alkali washing, acid washing, rinsing, drying and milling to provide a carbon material for EDLC electrodes. When an alkali metal compound is used as the activator, the amount of the alkali metal remained in the carbon material is not particularly restricted as long as the amount is less than the level that can interfere with EDLC made of the carbon material, preferably 1000 ppm or less. In general, it is preferred to wash the composition so that waste washing water has a pH such as about 7 to 8, and the alkali metal component is removed by washing as much as possible. The milling process is conducted by a method known in the art, and it is generally preferred to provide powder with an average particle diameter of 0.5 to 50 μm, and preferably about 1 to 20 μm.

Next, the EDLC according to the present invention is described.

The EDLC according to the present invention is characterized by comprising an electrode containing thus prepared carbon material for electrodes.

The electrode is composed of, for example, the carbon material for electrodes and a binder, and further preferably a conductive agent. The electrode may be combined with a collector in one unit.

The binder may be those known in the art, and examples thereof may include polyolefins such as polyethylene and polypropylene; fluorinated polymers such as polytetrafluoroethylene, polyvinylidene fluoride, and fluoroolefin/vinyl ether crosslinked copolymer; celluloses such as carboxymethyl cellulose; vinyl polymers such as polyvinyl pyrrolidone and polyvinyl alcohol; and polyacrylic acid. The content of the binder in the electrode is not particularly restricted, but, in general, properly selected in the range of about 0.1 to 30 wt % based on the total amount of the carbon material for electrodes and the binder.

Used as the conductive agent is carbon black, powder graphite, powder of titanium oxide, powder of ruthenium oxide, or the like. The amount of the conductive agent formulated into the electrode is properly selected depending on a the purpose of its formulation, but, in general, properly selected in the range of about 1 to 50 wt %, preferably in the range of about 2 to 30 wt % based on the total amount of the carbon material for electrodes, the binder and the conductive agent.

Note that the carbon material for electrodes, the binder and the conductive agent are mixed properly by a method known in the art. For example, adoptable is a method of adding a solvent that dissolves the binder to the components to prepare slurry, and uniformly applying the slurry to a collector; or a method of kneading the components without addition of a solvent and then pressing the components at ordinary temperature or under heating.

As for the collector, materials and shapes known in the art can be used. For example, usable are metals such as aluminum, titanium, tantalum, or nickel, and alloys such as stainless.

The unit cell of the EDLC according to the present invention is generally formed by using a pair of the electrodes as anode and cathode, placing the electrodes to face each other via a separator such as polypropylene fiber nonwoven fabric, glass fiber nonwoven fabric or synthetic cellulose paper, and immersing the electrodes into an electrolytic solution.

As for the electrolytic solution, aqueous electrolytic solutions or organic electrolytic solutions known in the art may be used, but it is more preferred to use organic electrolytic solutions. As for such organic electrolytic solutions, solvents used for electrochemical electrolytic solutions may be used. Examples of the solvents may include: propylene carbonate, ethylene carbonate, butylene carbonate, γ-butyrolactone, sulfolane, sulfolane derivatives, 3-methylsulfolane, 1,2-dimethoxyethane, acetonitrile, glutaronitrile, valeronitrile, dimethylformamide, dimethyl sulfoxide, tetrahydrofuran, dimethoxyethane, methyl formate, dimethyl carbonate, diethyl carbonate, and ethyl methyl carbonate. Note that these electrolytic solutions may be used in combination.

A supporting electrolyte in the organic electrolytic solutions is not particularly restricted, but usable are various electrolytes such as salts, acids or alkalis generally used in the electrochemical field or the battery field. Examples of the supporting electrolyte may include inorganic ionic salts such as alkali metal salts and alkaline-earth metal salts; quaternary ammonium salts; cyclic quaternary ammonium salts; and quaternary phosphonium salts. Preferred examples of the supporting electrolyte are $(C_2H_5)_4NBF_4$, $(C_2H_5)_3(CH_3)NBF_4$, $(C_2H_5)_4PBF_4$, $(C_2H_5)_3(CH_3)PBF_4$, and the like. The concentrations of such salts in electrolytic solutions are properly selected, in general, in the range of 0.1 to 5 mol/l, and preferably in the range of about 0.5 to 3 mol/l.

The more specific configuration of EDLC is not particularly restricted, but examples thereof may include: a coin type containing a pair of electrodes (positive and negative electrodes) in the form of sheet or disc having a thin thickness of 10 to 500 μm via a separator between the electrodes in a metal case; a wound type winding a pair of electrodes via a separator; a multilayer type stacking many electrodes via separators; and the like.

EXAMPLES

Hereinafter, the present invention is described further in detail with referring to Examples; however, the present invention is not restricted to the Examples.

(i) Preparation of Raw Carbon Composition

Raw carbon compositions were obtained by coking raw material oils having the compositions shown in the following Table 1 by using an autoclave under 1 MPa at 550° C. for 2 hours.

(ii) Manufacturing of Carbon Material 200 parts by weight of potassium hydroxide was mixed with 100 parts by weight of the raw carbon composition to effect an activation reaction in a nitrogen gas atmosphere at 750° C. for an hour. After completion of the reaction, metal potassium remained in the carbon material was removed by repeating rinsing and acid washing with HCl, and the carbon material was dried to obtain a carbon material for EDLC electrodes.

(iii) Preparation of Electrodes

To 80 parts by weight of the carbon material milled to have an average particle diameter of 20 μm, 10 parts by weight of carbon black and 10 parts by weight of polytetrafluoroethylene powder were added and kneaded in a mortar until the mixture turned into paste. Then thus obtained paste was rolled by using a roller press at 180 kPa to prepare an electrode sheet having a thickness of 200 μm.

(iv) Cell Assembly

Two discs having diameters of 16 mm were punched from the electrode sheet, and vacuum dried at 120° C. at 13.3 Pa (0.1 Torr) for 2 hours. After that, the electrodes were vacuum impregnated with an organic electrolytic solution (a solution of triethylmethylammonium tetrafluoro borate in propylene carbonate, concentration: 1 mole/l) in a glove box under a nitrogen atmosphere whose dew point is −85° C. Then the two sheets of electrodes were used as positive and negative electrodes; a cellulose separator (manufactured by NIPPON KODOSHI CORPORATION, trade name: TF40-50, thickness: 50 μm) was interposed between the electrodes; collectors of aluminum foils were attached to the both ends of the electrodes; and the electrodes were incorporated into a bipolar cell manufactured by Hohsen Corporation to prepare an electric double layer capacitor (a coin type cell).

(v) Determination of Capacitance

The coin type cell was charged up to 2.7 V with a constant current of 2 mA per 1 F. After the charging was complete, the cell was maintained at 2.7 V for 30 minutes and then discharged at a constant current of 1 mA. In a discharging curve where 80% of the charged voltage is defined as V1, 40% of the charged voltage is defined as V2, the time that the voltage takes for decreasing from 80% to 40% is defined as ΔT, and a discharging current value is defined as 1, capacitance C[F] is calculated by the following expression:

$$\text{Capacitance } C[F]=I\Delta T/(V1-V2)$$

The capacitance C[F] is divided by the weight of activated carbon contained in the electrodes (the total weight in positive and negative electrodes) to calculate capacitance [F/g] per weight. This F/g was multiplied by electrode density [g/cc] to calculate F/cc. The results are shown in Table 1.

TABLE 1

|  |  |  | Example | | | Comparative Example | | | |
| --- | --- | --- | --- | --- | --- | --- | --- | --- | --- |
|  |  |  | 1 | 2 | 3 | 1 | 2 | 3 | 4 |
| Raw material oil composition | Composition Ratio % | fa | 0.32 | 0.38 | 0.42 | 0.74 | 0.2 | 0.38 | 0.22 |
|  |  | Saturated Comp. | 40 | 37 | 35 | 4 | 48 | 23 | 31 |
|  |  | Aromatic Comp. | 47 | 56 | 61 | 94 | 31 | 51 | 32 |
|  |  | Resin Comp. | 6 | 4 | 3 | 2 | 9 | 14 | 19 |
|  |  | Asphaltene Comp. | 7 | 4 | 2 | 0 | 12 | 8 | 18 |
|  |  | MW | 599 | 461 | 377 | 277 | 840 | 762 | 990 |
|  |  |  | C % 95.0~96.5%, H % 2.5~4.0 | | | | | | |
| Capacitance (F/cc) |  |  | 30 | 32 | 33 | 19 | 22 | 20 | 18 |

The raw oil compositions of all Examples satisfying all the requirements of the present invention provide high capacitances of 30 F/cc or more. In contrast, Comparative Examples achieve capacitances of around 20 F/cc at most. In Comparative Example 1, the saturated component does not meet the requirement of the present invention, and its fa is high. In Comparative Example 2, the composition ratios and the average molecular weight meet the requirements of the present invention while the fa is out of the range of the present invention. In Comparative Example 3, the fa, the asphaltene component and the molecular weight meet the requirements of the present invention while the saturated component has less than the predetermined value. In Comparative Example 4, the asphaltene component is more than the requirement of the present invention, and the molecular weight is also out of the predetermined range. In summary, it has been established that a capacitor having high capacitance of 30 F/cc or more cannot be obtained even when any one of the conditions is not met to the requirements of the present invention.

The invention claimed is:

1. A raw oil composition for manufacturing a carbon material for electric double layer capacitor electrodes, characterized in that the raw oil composition comprises 25 wt % or more of a saturated component and 16 wt % or less of an asphaltene component among the saturated component, an aromatic component, a resin component, and the asphaltene component obtained by developing of the raw oil composition by thin-layer chromatography; the raw oil composition has an average molecular weight of 960 or less; and the raw oil composition has an aromatic-carbon-fraction (fa) of 0.22 to 0.72.

2. The raw oil composition according to claim 1, wherein the content of the aromatic component is 35 wt % or more.

3. A raw carbon composition, used for a carbon material for electric double layer capacitor electrodes, wherein the raw carbon composition is produced by carbonizing the raw oil composition according to claim 1.

4. The raw carbon composition according to claim 3, characterized by comprising graphite-like microcrystalline carbon.

5. A carbon material for electric double layer capacitor electrodes, wherein the carbon material is produced by activating the raw carbon composition according to claim 3.

6. The carbon material for electric double layer capacitor electrodes according to claim 5, characterized in that the activation is conducted by using an alkali metal compound.

7. The carbon material for electric double layer capacitor electrodes according to claim 5, characterized in that the activation is conducted in a temperature range of from 500° C. to 1000° C.

8. An electric double layer capacitor, characterized by comprising an electrode containing the carbon material for electrodes according to claim 5.

9. A raw carbon composition, used for a carbon material for electric double layer capacitor electrodes, wherein the raw carbon composition is produced by carbonizing the raw oil composition according to claim 2.

10. The raw carbon composition according to claim 9, characterized by comprising graphite-like microcrystalline carbon.

11. A carbon material for electric double layer capacitor electrodes, wherein the carbon material is produced by activating the raw carbon composition according to claim 9.

12. The carbon material for electric double layer capacitor electrodes according to claim 11, characterized in that the activation is conducted by using an alkali metal compound.

13. The carbon material for electric double layer capacitor electrodes according to claim 11, characterized in that the activation is conducted in a temperature range of from 500° C. to 1000° C.

14. An electric double layer capacitor, characterized by comprising an electrode containing the carbon material for electrodes according to claim 11.

* * * * *